United States Patent
Gaefke et al.

(10) Patent No.: US 12,084,612 B2
(45) Date of Patent: Sep. 10, 2024

(54) ACCELERATOR COMBINATION

(71) Applicant: Hilti Aktiengesellschaft, Schaan (LI)

(72) Inventors: Gerald Gaefke, Kaufbeuren (DE);
Beate Gnass, Gersthofen (DE);
Thomas Bürgel, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 541 days.

(21) Appl. No.: 17/439,204

(22) PCT Filed: Mar. 4, 2020

(86) PCT No.: PCT/EP2020/055646
§ 371 (c)(1),
(2) Date: Sep. 14, 2021

(87) PCT Pub. No.: WO2020/187565
PCT Pub. Date: Sep. 24, 2020

(65) Prior Publication Data
US 2022/0154063 A1 May 19, 2022

(30) Foreign Application Priority Data
Mar. 15, 2019 (EP) .................................... 19163043

(51) Int. Cl.
*C09K 8/44* (2006.01)
*C04B 26/02* (2006.01)
*C04B 26/06* (2006.01)
*C04B 26/14* (2006.01)
*C04B 26/16* (2006.01)
*C04B 26/18* (2006.01)
*C04B 26/32* (2006.01)
*C04B 28/02* (2006.01)
*C04B 40/06* (2006.01)
*C04B 111/00* (2006.01)
*C08F 2/38* (2006.01)
*C08F 4/00* (2006.01)
*C08F 222/10* (2006.01)
*E21B 23/01* (2006.01)

(52) U.S. Cl.
CPC ................ *C09K 8/44* (2013.01); *C04B 26/02* (2013.01); *C04B 26/06* (2013.01); *C04B 26/14* (2013.01); *C04B 26/16* (2013.01); *C04B 26/18* (2013.01); *C04B 26/32* (2013.01); *C04B 28/02* (2013.01); *C04B 40/065* (2013.01); *C08F 2/38* (2013.01); *C08F 4/00* (2013.01); *C08F 222/10* (2013.01); *C08F 222/102* (2020.02); *E21B 23/01* (2013.01); *C04B 2111/00715* (2013.01)

(58) Field of Classification Search
CPC ......... C04B 26/06; C04B 26/14; C04B 26/18; C04B 26/16; C04B 26/32; C04B 26/02; C04B 28/02; C04B 40/065; C04B 2111/00715; C08F 222/102; C08F 4/00; C08F 2/38; C08F 222/10; C09K 8/44; E21B 23/01
See application file for complete search history.

(56) References Cited

U.S. PATENT DOCUMENTS

| | | | |
|---|---|---|---|
| 6,203,911 | B1 | 3/2001 | Weberg et al. |
| 6,429,158 | B1 | 8/2002 | Weberg et al. |
| 6,746,640 | B2 | 6/2004 | Weberg et al. |
| 8,283,431 | B2 | 10/2012 | Westmijze et al. |
| 9,463,449 | B2 | 10/2016 | Buergel |
| 10,829,578 | B2 | 11/2020 | Nickeri et al. |
| 2003/0104743 | A1 | 6/2003 | Weberg et al. |
| 2006/0149014 | A1 | 7/2006 | Westmijze et al. |
| 2013/0112432 | A1 | 5/2013 | Buergel |
| 2020/0140593 | A1 | 5/2020 | Nickeri et al. |
| 2020/0140602 | A1 | 5/2020 | Bunzen et al. |
| 2020/0354495 | A1 | 11/2020 | Nickerl et al. |

FOREIGN PATENT DOCUMENTS

| | | |
|---|---|---|
| EP | 2 518 033 | 10/2012 |
| EP | 3 428 208 | 1/2019 |
| WO | 99/65950 | 12/1999 |
| WO | 2004/096871 | 11/2004 |
| WO | 2019/007687 | 1/2019 |

OTHER PUBLICATIONS

International Search Report issued on May 14, 2020 in PCT/EP2020/055646, 6 pages with English translation.
Written Opinion issued May 14, 2020 in PCT/EP2020/055646, 11 pages with English translation.

*Primary Examiner* — Patrick D Niland
(74) *Attorney, Agent, or Firm* — Grüneberg and Myers PLLC

(57) ABSTRACT

A reactive resin contains at least one accelerator with high reactivity and at least one accelerator with low reactivity. A combination of at least one accelerator with high reactivity and at least one accelerator with low reactivity can be used in a reactive resin system. An accelerator composition can be used for a reactive resin system containing at least one accelerator with high reactivity and at least one accelerator with low reactivity.

16 Claims, No Drawings

ACCELERATOR COMBINATION

CROSS-REFERENCE TO RELATED APPLICATIONS

This application is a National Stage entry under § 371 of International Application No. PCT/EP2020/055646, filed on Mar. 4, 2020, and which claims the benefit of priority to European Application No. 19163043.3, filed on Mar. 15, 2019. The content of each of these applications is hereby incorporated by reference in its entirety.

BACKGROUND OF THE INVENTION

Field of the Invention

The present invention relates to a reactive resin containing at least one accelerator with high reactivity and at least one accelerator with low reactivity, to the use of a combination of at least one accelerator with high reactivity and at least one accelerator with low reactivity in a reactive resin system, and to an accelerator composition for a reactive resin system comprising at least one accelerator with high reactivity and at least one accelerator with low reactivity.

Description of Related Art

The use of chemical fastening agents based on radically curable resins has long been known. In the field of fastening technology, the use of resins as an organic binder for the chemical fastening technology, e.g. as a constituent of a dowel composition ("chemical dowel"), has prevailed. Dowel compositions of this kind are composite materials which are packaged as multicomponent systems, usually two-component systems, with one component (the reactive resin component) containing the radically curable resin and the other component (the hardener component) containing an initiator (for radical formation). Other common constituents such as additives, fillers, accelerators, inhibitors, solvents, and reactive diluents can be contained in one and/or the other component. By mixing the two components, the curing reaction, i.e. the polymerization, is initiated by radical formation and the resin is cured to obtain duromers.

In conventional reactive resin components, inter alia epoxy (meth)acrylate resins which can be obtained by reacting epoxide, e.g. bisphenol A diglycidyl ether (BADGE), with $\alpha,\beta$-unsaturated carboxylic acid, e.g. methacrylic acid, are usually used as radically curable resins. Epoxy (meth)acrylate resins are usually cured radically or using radiation. Peroxides such as diacetyl peroxide, hydroperoxides or peroxy esters are typically added as the radical source for the radical curing. Stable peroxides are preferred due to the long shelf life thereof, however, said peroxides form radicals by means of thermal decomposition only at elevated temperatures. In order to enable curing at room temperature, it is necessary to accelerate the peroxide decomposition and the radical formation using additives, i.e. to add what is referred to as an accelerator. Using such accelerators, the processing time of reactive resin systems can thus be adjusted.

Salts or complexes of transition metals (Cu, V, Co, Mn, Fe, etc.) or tertiary aromatic amines as additives in the resins are usually used as accelerators of this kind.

However, long processing times are usually at the expense of performance (e.g. load values and bond stress). Hitherto known reactive resin systems with long processing times are disadvantageous in that the curing is negatively impacted by the delay.

There is therefore a need to adjust a long processing time for radically curable systems without adversely affecting the delayed curing.

SUMMARY OF THE INVENTION

This problem is solved by the resins described herein and the accelerators used therein which vary in reactivity.

In particular, a reactive resin according to the invention is characterized in that it contains at least one accelerator with high reactivity and at least one accelerator with low reactivity, the molar ratio of the at least one accelerator with high reactivity with respect to the at least one accelerator with low reactivity being from 1.0:1.0 to 1.0:1.6.

An accelerator with high reactivity is characterized in that a reactive resin has a gel time according to test example 1 of from 2 minutes to 40 minutes if it contains the accelerator with high reactivity as the only accelerator. An accelerator with low reactivity is characterized in that a reactive resin has a gel time according to test example 1 of from 40 minutes to 200 minutes if it contains the accelerator with low reactivity as the only accelerator.

DETAILED DESCRIPTION OF THE INVENTION

For example, accelerators that can be used in the present invention can be obtained by reacting a primary or secondary aromatic amine with a diglycidyl ether. One such accelerator as can be used in the present invention is di-isopropanol-p-toluidine (DiPpT) shown below:

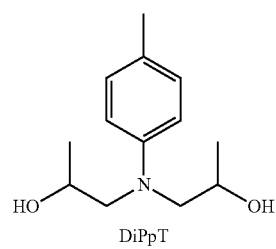 [SMILES: Cc1ccc(N(CC(C)O)CC(C)O)cc1]

DiPpT

Furthermore, accelerators that can be used in the present invention can be obtained for example by reacting a primary or secondary aromatic amine with a diglycidyl ether and an $\alpha,\beta$-unsaturated carboxylic acid. In this synthesis, (1) an aromatic primary or secondary amine is reacted with (2) a diglycidyl ether and (3) an $\alpha,\beta$-unsaturated carboxylic acid. The reaction typically takes place in the presence of (4) a catalyst. (5) an inhibitor can optionally be present in the reaction mixture. An exemplary synthesis with a primary aromatic amine (here: para-toluidine) takes place as follows:

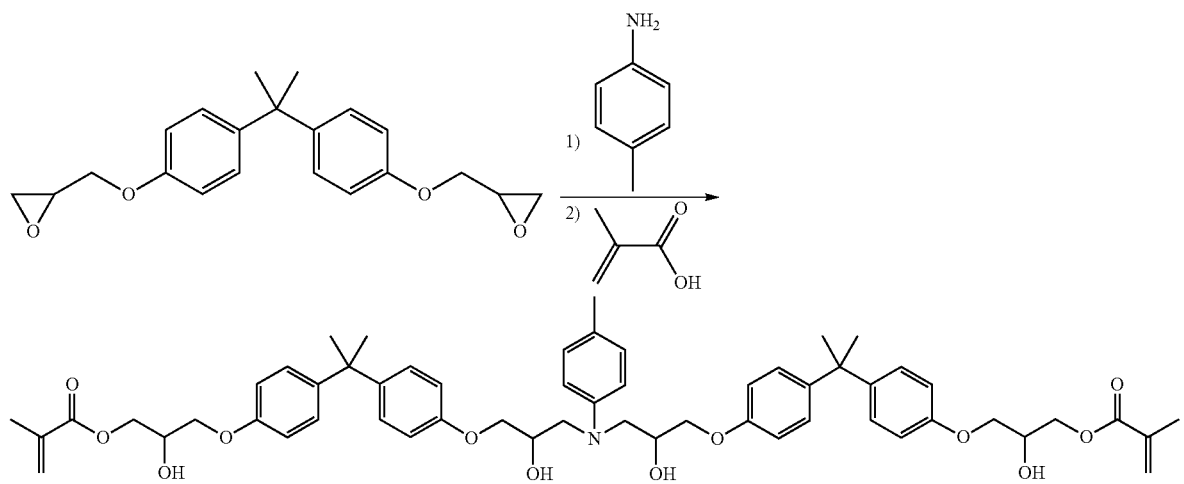

1. Preparation of the Backbone Resin/Reactive Resin Masterbatch

A diglycidyl ether, for example bisphenol A diglycidyl ether, and an α,β-unsaturated carboxylic acid, for example methacrylic acid, are reacted in the presence of a catalyst and an inhibitor (which is used to stabilize the backbone resin formed by the polymerization). This produces the backbone resin.

The reaction mixture obtained after completion of the reaction is referred to as a reactive resin masterbatch. This is not further processed, i.e. the backbone resin is not isolated.

2. Preparation of the Reactive Resin

The backbone resin or reactive resin masterbatch, for example the reaction mixture of the preparation of the backbone resin/reactive resin masterbatch described under 1, is mixed with at least one accelerator with high reactivity, at least one accelerator with low reactivity, one or more reactive diluents and one or more inhibitors.

The order in which the individual components of the reactive resin are mixed together is not relevant. Typically, the at least one accelerator with high reactivity and the at least one accelerator with low reactivity are provided and then the reactive resin masterbatch, the reactive diluent and the inhibitor are added sequentially.

A first object of the invention is a reactive resin containing at least one accelerator with high reactivity and at least one accelerator with low reactivity, the molar ratio of the at least one accelerator with high reactivity with respect to the at least one accelerator with low reactivity being from 1.0:1.0 to 1.0:1.6.

A second object of the invention is a reactive resin component (A) which contains a reactive resin according to the invention.

A third object of the invention is a reactive resin system comprising a reactive resin component (A) according to the invention and a hardener component (B) containing an initiator (such as a peroxide) for curing the reactive resin. Components (A) and (B) are packaged so as to be spatially separated from one other until use of the reactive resin system, so that a reaction takes place only when the two components are brought into contact with one other.

A fourth object of the invention is the use of a reactive resin according to the invention and/or a reactive resin system according to the invention for chemically fastening anchoring means in boreholes or for structural bonding.

A fifth object of the invention is the use of a combination of at least one accelerator with high reactivity and at least one accelerator with low reactivity in a reactive resin system to adjust the processing time.

A sixth object of the invention is the use of at least one accelerator with high reactivity in a reactive resin system containing at least one accelerator with low reactivity to adjust the processing time.

A seventh object of the invention is the use of at least one accelerator with low reactivity in a reactive resin system containing at least one accelerator with high reactivity to adjust the processing time.

An eighth object of the invention is an accelerator composition for a reactive resin system comprising at least one accelerator with high reactivity and at least one accelerator with low reactivity, the molar ratio of the at least one accelerator with high reactivity with respect to the at least one accelerator with low reactivity being from 1.0:1.0 to 1.0:1.6.

Within the meaning of the invention:

"backbone resin" means a typically solid or high-viscosity radically polymerizable resin which cures by means of polymerization (e.g. after addition of an initiator in the presence of an accelerator, which according to the invention is an accelerator combination);

"reactive resin masterbatch" means the reaction product of the reaction for preparing the backbone resin, i.e. a mixture of backbone resin, an inhibitor and other constituents (e.g. a catalyst) of the reaction mixture;

"reactive resin" means a mixture of reactive resin masterbatch, one or more inhibitors, a reactive diluent and optionally further additives; the reactive resin is typically liquid or viscous and can be further processed to form a reactive resin component; the reactive resin is also referred to herein as a "resin mixture";

"inhibitor" means a substance which suppresses unwanted radical polymerization during the synthesis or storage of a resin or a resin-containing composition (these substances are also referred to in the art as "stabilizers"), or which delays radical polymerization of a resin after addition of an initiator, usually in conjunction with an accelerator (these substances are also referred to in the art as "inhibitors"—the particular meaning of the term becomes clear from the context);

"initiator" means a substance which (usually in combination with an accelerator) forms reaction-initiating radicals;

"accelerator" means a reagent which reacts with the initiator so that larger quantities of free radicals are produced by the initiator even at low temperatures, or which catalyzes the decomposition reaction of the initiator;

"reactive diluents" means liquid or low-viscosity monomers and backbone resins which dilute other backbone resins or the reactive resin masterbatch and thereby impart the viscosity necessary for application thereof, which contain functional groups capable of reacting with the backbone resin, and which for the most part become a constituent of the cured composition (e.g. of the mortar) during the polymerization (curing); reactive diluents are also referred to as co-polymerizable monomers:

"gel time," $t_{g25°\,C.}$, means the time (t) of the curing phase of a reactive resin ($t_{hg25°\,C.}$), as defined herein, or a reactive resin component ($t_{mg25°\,C.}$), as defined herein, in which the temperature is increased from a starting temperature of 25° C. at a gel time measurement to e.g. 50° C.; a method for determining the gel time is described in the examples;

"mortar reactivity" $t_{m,25\rightarrow 50°\,C.}$ (also referred to as "reactivity time" here) means the period of time from the time of the addition of an initiator to initialize the curing to the time when the composition has reached a temperature of 50° C.

"maximum reactivity temperature $T_{max}$" means the temperature at which the temperature profile passes through a maximum during a reactivity measurement (for example the gel time measurement described in the examples);

"completion of the reaction" or "reaction end" or "reaction completion" means the time at which a reaction was completely executed; this is recognizable in the case of a chemical reaction, such as the reaction for producing the backbone resin, usually because the exothermicity related to the reaction has ended;

"reactive resin component" means a liquid or viscous mixture of reactive resin and fillers and optionally further components, e.g. fillers, additives; typically, the reactive resin component is one of the two components of a two-component reactive resin system for chemical fastening;

"hardener component" means a composition containing an initiator for the polymerization of a backbone resin: the hardener component may be solid or liquid and may contain, in addition to the initiator, a solvent and fillers and/or additives; typically, the hardener component, in addition to the reactive resin component, is the other of the two components of a two-component reactive resin system for chemical fastening;

"two-component system" or "two-component reactive resin system" means a reactive resin system comprising two separately stored components, a reactive resin component (A) and a hardener component (B), so that curing of the backbone resin contained in the reactive resin component takes place only after the mixing of the two components;

"multi-component system" or "multi-component reactive resin system" means a reactive resin system comprising a plurality of separately stored components, including a reactive resin component (A) and a hardener component (B), so that curing of the backbone resin contained in the reactive resin component takes place only after all of the components are mixed;

"(meth)acryl . . . / . . . (meth)acryl . . . " means both the "methacryl . . . / . . . methacryl . . . " and the "acryl . . . / . . . acryl . . . " compounds; "methacryl . . . / . . . methacryl . . . " compounds are preferred in the present invention;

"epoxy (meth)acrylate" means an epoxy resin which has acrylate or methacrylate groups and is substantially free of epoxy groups;

"alkyl" means a saturated hydrocarbon group that can be branched or unbranched; preferably a $C_1$-$C_{20}$ alkyl, particularly preferably a $C_1$-$C_4$ alkyl, i.e. an alkyl selected from the group consisting of methyl, ethyl, n-propyl, iso-propyl, n-butyl, iso-butyl, and tert-butyl; methyl, ethyl and tert-butyl are particularly preferred and methyl is very particularly preferred;

"hydroxyalkyl" means an alkyl carrying at least one hydroxyl group as a substituent;

"alkenyl" means an unsaturated hydrocarbon group having at least one double bond, which can be branched or unbranched; preferably a $C_2$-$C_{20}$ alkenyl, particularly preferably a $C_2$-$C_6$ alkenyl; i.e. an alkenyl selected from the group consisting of ethenyl, propenyl, butenyl, pentenyl and hexenyl; ethenyl, propenyl and butenyl are particularly preferred, and ethenyl is very particularly preferred;

"hydroxy-alkenyl" means an alkenyl which carries at least one hydroxyl group as a substituent;

"alkynyl" means an unsaturated hydrocarbon group having at least one triple bond, which can be branched or unbranched; preferably a $C_2$-$C_{20}$ alkynyl, particularly preferably a $C_2$-$C_6$ alkynyl, i.e. an alkynyl selected from the group consisting of ethynyl, propynyl, butynyl, pentynyl and hexynyl; ethynyl, propynyl and butynyl are particularly preferred, and ethenyl is very particularly preferred;

"hydroxy-alkynyl" means an alkynyl which carries at least one hydroxyl group as a substituent;

"cold curing" means that a resin mixture or a reactive resin system can cure completely at room temperature;

"a" or "an" as the article preceding a class of chemical compounds, e.g. preceding the word "epoxy methacrylate," means that one or more compounds included in this class of chemical compounds, e.g. various epoxy methacrylates, may be intended. In a preferred embodiment, this article means only a single compound;

"at least one" means numerically "one or more." In a preferred embodiment, the term numerically means "one";

"contain," "comprise," and "include" mean that further constituents may be present in addition to those mentioned. These terms are intended to be inclusive and therefore also encompass "consist of." "Consist of" is intended to be exclusive and means that no further constituents may be present. In a preferred embodiment, the terms "contain." "comprise" and "include" mean the term "consist of";

"approximately" or "approx." before a numerical value means a range of ±5% of this value, preferably ±2% of this value, more preferably ±1% of this value, particularly preferably ±0% of this value (i.e. exactly this value);

a range limited by numbers, e.g. "from 80° C. to 120° C.," means that the two extreme values and any value within this range are disclosed individually.

All standards cited in this text (e.g. DIN standards) were used in the version that was current on the filing date of this application.

According to the present invention, an accelerator with high reactivity is characterized in that a reactive resin has a gel time according to test example 1 of from 2 minutes to 40 minutes if it contains the accelerator with high reactivity as the only accelerator.

According to the present invention, an accelerator with low reactivity is characterized in that a reactive resin has a gel time according to test example 1 of from 40 minutes to 200 minutes if it contains the accelerator with low reactivity as the only accelerator.

The molar ratio of the at least one accelerator with high reactivity with respect to the at least one accelerator with low reactivity is from 1.0:1.0 to 1.0:1.6.

In a preferred embodiment, the molar ratio of the at least one accelerator with high reactivity with respect to the at least one accelerator with low reactivity is from 1.0:1.1 to 1.0:1.6.

In one embodiment, the at least one accelerator with high reactivity can be covalently incorporated in the resin.

In a further embodiment, the at least one accelerator with low reactivity can be covalently incorporated in the resin.

Furthermore, both the at least one accelerator with high reactivity and the at least one accelerator with low reactivity can be covalently incorporated in the resin.

The accelerators and accelerator combinations described in the examples characterize a preferred embodiment of the invention.

The combination of at least one accelerator with high reactivity and at least one accelerator with low reactivity makes it possible to adjust the processing time without having negative effects on the performance, for example load values such as the bond stress. In particular, the combination of at least one accelerator with high reactivity and at least one accelerator with low reactivity makes it possible to achieve processing times which are as long as possible without impairing the performance.

Suitable accelerators with high reactivity and suitable accelerators with low reactivity include amines and/or metal salts such as aromatic amines, for example, toluidines, such as di-iso-propanol-p-toluidine (DiPpT), di-hydroxyethyl-m-toluidine (DHEmT) and diethyl-p-toluidine (DEpT). Whether an amine or metal salt is an accelerator with high reactivity or an accelerator with low reactivity is determined solely by the fact that a reactive resin has a gel time according to test example 1 of from 2 minutes to 40 minutes if it contains the accelerator with high reactivity as the only accelerator and has a gel time according to test example 1 of from 40 minutes to 200 minutes if it contains the accelerator with low reactivity as the only accelerator.

Suitable amines are selected from the following compounds, which are described in the application US 2011071234 A1, for example: Dimethylamine, trimethylamine, ethylamine, diethylamine, triethylamine, n-propylamine, di-n-propylamine, tri-n-propylamine, iso-propylamine, di-iso-propylamine, tri-iso-propylamine, n-butylamine, iso-butylamine, tert-butylamine, di-n-butylamine, di-iso-butylamine, tri-iso-butylamine, n-pentylamine, iso-pentylamine, di-iso-pentylamine, hexylamine, octylamine, dodecylamine, laurylamine, stearylamine, aminoethanol, diethanolamine, triethanolamine, aminohexanol, ethoxyaminoethane, dimethyl(2-chloroethyl)amine, 2-ethylhexylamine, bis(2-chloroethyl)amine, 2-ethylhexylamine, bis(2-ethylhexyl)amine, N-methylstearylamine, dialkylamines, ethylenediamine, N,N'-dimethylethylenediamine, tetramethylethylenediamine, diethylenetriamine, permethyldiethylenetriamine, triethylenetetramine, tetraethylenepentamine, 1,2-diaminopropane, di-propylenetriamine, tripropylenetetramine, 1,4-diaminobutane, 1,6-diaminohexane, 4-amino-1-diethylaminopentane, 2,5-diamino-2,5-dimethylhexane, trimethylhexamethylenediamine, N,N-dimethylaminoethanol, 2-(2-diethylaminoethoxy)ethanol, bis(2-hydroxyethyl)oleylamine, tris[2(2-hydroxyethoxy)ethyl]amine, 3-amino–1-propanol, methyl(3-aminopropyl)ether, ethyl-(3-aminopropyl)ether, 1,4-butanediol-bis(3-aminopropyl ether), 3-dimethylamino-1-propanol, 1-amino-2-propanol, 1-diethylamino-2-propanol, di-iso-propanolamine, methyl-bis(2-hydroxypropyl)amine, tris(2-hydroxypropyl)amine, 4-amino-2-butanol, 2-amino-2-methylpropanol, 2-amino-2-methylpropanediol, 2-amino-2-hydroxymethylpropanediol, 5-diethylamino-2-pentanone, 3-methylaminopropionitrile, 6-aminohexanoic acid, 11-aminoundecanoic acid, 6-aminohexanoic acid ethyl ester, 11-aminohexanoate-isopropyl ester. cyclohexylamine, N-methylcyclohexylamine. N,N-dimethylcyclohexylamine, dicyclohexylamine, N-ethylcyclohexylamine, N-(2-hydroxyethyl)cyclohexylamine, N,N-bis(2-hydroxyethyl)cyclohexylamine, N-(3-aminopropyl)cyclohexylamine, aminomethylcyclohexane, hexahydrotoluidine, hexahydrobenzylamine, aniline, N-methylaniline, N,N-dimethylaniline, N,N-diethylaniline, N,N-di-propylaniline, iso-butylaniline, toluidine, diphenylamine, hydroxyethylaniline, bis(hydroxyethyl)aniline, chloroaniline, aminophenols, aminobenzoic acids and esters thereof, benzylamine, dibenzylamine, tribenzylamine, methyldibenzylamine, β-phenylethylamine, xylidine, di-iso-propylaniline, dodecylaniline, aminonaphthalene, N-methylaminonaphthalene, N,N-dimethylaminonaphthalene, N,N-dibenzylnaphthalene, diaminocyclohexane, 4,4'-diaminodicyclohexylmethane, diamino-dimethyl-dicyclohexylmethane, phenylenediamine, xylylenediamine, diaminobiphenyl, naphthalenediamines, toluidines, benzidines, 2,2-bis(aminophenyl)propane, aminoanisoles, aminothiophenols, aminodiphenyl ethers, aminocresols, morpholine, N-methylmorpholine, N-phenylmorpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholineethane, [2,2,2]-diazabicyclooctane and N,N-dimethyl-p-toluidine.

Suitable metal salts are, for example, cobalt octoate or cobalt naphthenoate as well as vanadium, potassium, calcium, copper, iron, manganese or zirconium carboxylates.

Suitable aniline and toluidine derivatives and N,N-bisalkylarylamines are N,N-dimethylaniline, N,N-diethylaniline, N,N-dimethyl-p-toluidine, N,N-bis(hydroxyalkyl)arylamine. N,N-bis(2-hydroxyethyl)aniline, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine and 4,4'-bis(dimethylamino)diphenylmethane.

Preferred accelerators of the present invention are

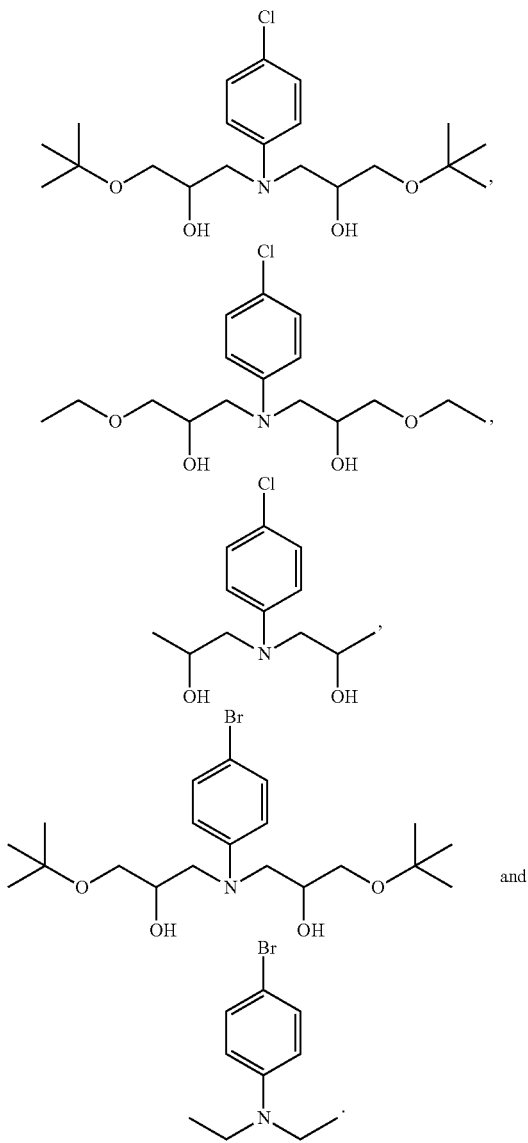

and

According to the invention, suitable backbone resins are ethylenically unsaturated compounds, compounds which have carbon-carbon triple bonds, and thiol-yne/ene resins, as are known to a person skilled in the art.

Of these compounds, the group of ethylenically unsaturated compounds is preferred, which group comprises styrene and derivatives thereof, (meth)acrylates, vinyl esters, unsaturated polyesters, vinyl ethers, allyl ethers, itaconates, dicyclopentadiene compounds and unsaturated fats, of which unsaturated polyester resins and vinyl ester resins are particularly suitable and are described, for example, in the applications EP 1 935 860 A1, DE 195 31 649 A1 and WO 10/108939 A1. Vinyl ester resins are in this case most preferred due to the hydrolytic resistance and excellent mechanical properties thereof.

Examples of suitable unsaturated polyesters which can be used in the resin mixture according to the invention are divided into the following categories, as classified by M. Malik et al. in J. M. S.—Rev. Macromol. Chem. Phys., C40 (2 and 3), p. 139-165 (2000):

(1) ortho-resins: these are based on phthalic anhydride, maleic anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol A;

(2) iso-resins: these are prepared from isophthalic acid, maleic anhydride or fumaric acid and glycols. These resins can contain higher proportions of reactive diluents than the ortho resins;

(3) bisphenol A fumarates: these are based on ethoxylated bisphenol A and fumaric acid;

(4) HET acid resins (hexachloroendomethylene tetrahydrophthalic acid resins): these are resins obtained from chlorine/bromine-containing anhydrides or phenols during the preparation of unsaturated polyester resins.

In addition to these resin classes, what are referred to as dicyclopentadiene resins (DCPD resins) can also be distinguished as unsaturated polyester resins. The class of DCPD resins is either obtained by modifying one of the above-mentioned resin types by means of a Diels-Alder reaction with cyclopentadiene, or said resins are alternatively obtained by means of a first reaction of a diacid, for example maleic acid, with dicyclopentadiene and then by means of a second reaction of the usual preparation of an unsaturated polyester resin, the latter being referred to as a DCPD maleate resin.

The unsaturated polyester resin preferably has a molecular weight Mn in the range of 500 to 10,000 daltons, more preferably in the range of 500 to 5000 and even more preferably in the range of 750 to 4000 (according to ISO 13885-1). The unsaturated polyester resin has an acid value in the range of 0 to 80 mg KOH/g resin, preferably in the range of 5 to 70 mg KOH/g resin (according to ISO 2114-2000). If a DCPD resin is used as the unsaturated polyester resin, the acid value is preferably 0 to 50 mg KOH/g resin.

In the context of the invention, vinyl ester resins are oligomers or polymers having at least one (meth)acrylate end group, what are referred to as (meth)acrylate-functionalized resins, which also include urethane (meth)acrylate resins and epoxy (meth)acrylates.

Vinyl ester resins, which have unsaturated groups only in the end position, are obtained, for example, by reacting epoxy oligomers or polymers (for example bisphenol A digylcidyl ether, phenol novolac-type epoxies or epoxy oligomers based on tetrabromobisphenol A) with (meth)acrylic acid or (meth)acrylamide, for example. Preferred vinyl ester resins are (meth)acrylate-functionalized resins and resins which are obtained by reacting epoxy oligomers or polymers with methacrylic acid or methacrylamide, preferably with methacrylic acid. Examples of compounds of this kind are known from the applications U.S. Pat. Nos. 3,297,745 A, 3,772,404 A, 4,618,658 A, GB 2217722 A1, DE 3744390 A1 and DE 4131457 A1.

In this context, reference is made to the application US 2011/071234, the content of which is hereby incorporated into this application.

The vinyl ester resin preferably has a molecular weight Mn in the range of 500 to 3000 daltons, more preferably 500 to 1500 daltons (according to ISO 13885-1). The vinyl ester resin has an acid value in the range of 0 to 50 mg KOH/g resin, preferably in the range of 0 to 30 mg KOH/g resin (according to ISO 2114-2000).

Ethoxylated bisphenol A di(meth)acrylate having a degree of ethoxylation of 2 to 10, preferably of 2 to 4, difunctional, trifunctional or higher functional urethane (meth)acrylate oligomers, or mixtures of these curable constituents are particularly suitable as the vinyl ester resin.

The known reaction products of di- or polyisocyanates and hydroxyalkylmethylacrylates, as described, for example, in DE 2 312 559 A1, adducts of (di)isocyanates and 2,2-propane bis[3-(4-phenoxy)-1,2-hydroxypropane-1-methacrylate] according to US-PS 3 629 187, and the adducts of isocyanates and methacryloyl alkyl ethers, alkoxybenzenes or alkoxycycloalkanes, as described in EP 44352 A1, are very particularly suitable. In this context, reference is made to DE 2312559 A1, DE 19902685 A1, EP 0684906 A1, DE 4111828 A1 and DE 19961342 A1. Of course, mixtures of suitable monomers can also be used.

All of these resins that can be used according to the invention can be modified according to methods known to a person skilled in the art, for example to achieve lower acid numbers, hydroxide numbers or anhydride numbers, or can be made more flexible by introducing flexible units into the backbone, and the like.

In addition, the resin may contain other reactive groups that can be polymerized with a radical initiator, such as peroxides, for example reactive groups derived from itaconic acid, citraconic acid and allylic groups and the like, as described, for example, in WO 2010/108939 A1 (itaconic acid ester).

The percentual proportion (in wt. % of the reactive resin) of backbone resin in the reactive resin according to the invention is advantageously greater than approximately 5%, preferably greater than approximately 15%, and particularly preferably greater than approximately 20%. The percentual proportion (in wt. % of the reactive resin) of backbone resin in the reactive resin is advantageously approx. 5% to approx. 90%, preferably approx. 8% to approx. 80%, more preferably approx. 10% to approx. 60%, more preferably approx. 20% to approx. 55%, even more preferably approx. 25% to approx. 55%, particularly preferably approx. 25% to approx. 50%, and very particularly preferably approx. 28% to approx. 45%.

The proportion (in mmol amine per 100 g of the reactive resin) of the at least one accelerator with high reactivity and the at least one accelerator with low reactivity in the reactive resin according to the invention is 0.5 to 50, preferably 1 to 20, particularly preferably 5 to 15 mmol amine/100 g of reactive resin.

One or more inhibitors are present in the reactive resin according to the invention, both to stabilize the reactive resin or the reactive resin component (A) containing the reactive resin, or other compositions containing the reactive resin, and to adjust the resin reactivity.

The inhibitors which are conventionally used for radically polymerizable compounds, as are known to a person skilled in the art, are suitable for this purpose. These inhibitors are preferably selected from phenolic inhibitors and non-phenolic inhibitors, in particular phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, catechols such as pyrocatechol, and catechol derivatives such as butylpyrocatechols such as 4-tert-butylpyrocatechol and 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, are suitable as phenolic inhibitors. These inhibitors are often a constituent of commercial radically curing reactive resin components.

Phenothiazines such as phenothiazine and/or derivatives or combinations thereof, or stable organic radicals such as galvinoxyl and N-oxyl radicals, in particular of the piperidinyl-N-oxyl or tetrahydropyrrole-N-oxyl type, are preferably considered as non-phenolic inhibitors, such as aluminum-N-nitrosophenylhydroxylamine, diethylhydroxylamine, oximes such as acetaldoxime, acetone oxime, methyl ethyl ketoxime, salicyloxime, benzoxime, glyoximes, dimethylglyoxime, acetone-O-(benzyloxycarbonyl)oxime, TEMPOL, TEMPO and the like.

Furthermore, pyrimidinol or pyridinol compounds substituted in para-position to the hydroxyl group, as described in the patent DE 10 2011 077 248 B1, can be used as inhibitors.

Examples of stable N-oxyl radicals which can be used are those described in DE 199 56 509 A1 and DE 195 31 649 A1. Stable nitroxyl radicals of this kind are of the piperidinyl-N-oxyl or tetrahydropyrrole-N-oxyl type or a mixture thereof.

Preferred stable nitroxyl radicals are selected from the group consisting of 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL) and mixtures of two or more of these compounds, with 1-oxyl-2,2,6,6-tetramethylpiperdin-4-ol (TEMPOL) being particularly preferred.

The inhibitor or inhibitors are preferably selected from the group consisting of N-oxyl radicals, catechols, catechol derivatives and phenothiazines and a mixture of two or more thereof. The inhibitor or inhibitors selected from the group consisting of tempol, catechols and phenothiazines are particularly preferred. The further inhibitors used in the examples are very particularly preferred, preferably approximately in the amounts stated in the examples.

The inhibitors can be used either alone or as a combination of two or more thereof, depending on the desired properties of the reactive resin. The combination of phenolic and non-phenolic inhibitors is preferred.

The inhibitor or inhibitor mixture is added in conventional amounts known in the art, preferably in an amount of approximately 0.0005 to approximately 2 wt. % (based on the reactive resin, which is ultimately prepared therewith), more preferably from approximately 0.01 to approximately 1 wt. % (based on the reactive resin), even more preferably from approximately 0.05 to approximately 1 wt. % (based on the reactive resin).

The reactive resin according to the invention contains at least one reactive diluent.

Suitable reactive diluents are low-viscosity, radically co-polymerizable compounds, preferably compounds free of labeling.

Suitable reactive diluents are described in the applications EP 1 935 860 A1 and DE 195 31 649 A1. The reactive resin preferably contains, as the reactive diluent, a (meth)acrylic acid ester, with aliphatic or aromatic $C_5$-$C_{15}$-(meth)acrylates being particularly preferably selected. Suitable examples include: 2-, 3-hydroxypropyl(meth)acrylate (HP(M)A), 1,2-ethanediol di(meth)acrylate, 1,3-propanediol di(meth)acrylate, 1,3-butanediol di(meth)acrylate, 1,4-butanediol di(meth)acrylate, trimethylolpropane tri(meth)acrylate, phenethyl (meth)acrylate, tetrahydrofurfuryl (meth)acrylate, ethyltriglycol (meth)acrylate, N,N-dimethylaminoethyl (meth)acrylate, N,N-dimethylaminomethyl (meth)acrylate, acetoacetoxyethyl (meth)acrylate, isobornyl (meth)acrylate, 2-ethylhexyl (meth)acrylate, diethylene glycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, bisphenol A (meth)acrylate, novolac epoxy di(meth)acrylate, di-[(meth)acryloyl-maleoyl]-ticyclo-5.2.1.0.$^{2-6}$-decane, dicyclopentenyloxyethylcrotonate, 3-(meth)acryloyl-oxymethyl-tricylo-5.2.1.0.$^{2-6}$-decane, 3-(meth)cyclopentadienyl (meth)acrylate, and decalyl-2-(meth)acrylate; PEG-di(meth)acrylate such as PEG200 di(meth)acrylate, tetraethylene glycol di(meth)acrylate, solketal (meth)acrylate, cyclohexyl (meth)acrylate, phenoxyethyl di(meth)acrylate, methoxyethyl (meth)acrylate, tert-butyl (meth)acrylate and norbornyl (meth)acrylate. Methacrylates are preferred over acrylates. Particularly preferred are 2- and 3-hydroxypropyl methacrylate (HPMA), 1,2-ethanediol dimethacrylate, 1,4-butanediol dimethacrylate (BDDMA), 1,3-butanediol dimethacrylate, trimethylolpropane trimethacrylate, acetoacetoxyethyl methacrylate, isobornyl methacrylate, bisphenol A methacrylate, trimethylcyclohexyl methacrylate, 2-hydroxyethyl methacrylate, PEG200 dimethacrylate and norbornyl methacrylate. 1,4-butanediol dimethacrylate and a mixture of 2- and 3-hydroxypropyl methacrylate (HPMA), or a mixture of these three methacrylates, are very particularly preferred. A mixture of 2- and 3-hydroxypropyl methacrylate (HPMA) is most preferred. In principle, other conventional radically polymerizable compounds, alone or in a mixture with the (meth)acrylic acid esters, can also be used as reactive diluents, e.g. styrene, α-methylstyrene, alkylated styrenes, such as tert-butylstyrene, divinylbenzene and vinyl and allyl compounds, of which the representatives that are not subject to labeling are preferred. Examples of vinyl or allyl compounds of this kind are hydroxybutyl vinyl ether, ethylene glycol divinyl ether, 1,4-butanediol divinyl ether, trimethylolpropane divinyl ether, trimethylolpropane trivinyl ether, mono-, di-, tri-, tetra- and polyalkylene glycol vinyl ether, mono-, di-, tri-, tetra- and polyalkylene glycol allyl ether, adipic acid divinyl ester, trimethylolpropane diallyl ether and trimethylolpropane triallyl ether.

The reactive diluents used in the examples are very particularly preferred, preferably approximately in the amounts stated in the examples.

The reactive diluent(s) is/are preferably present in the reactive resin according to the invention in an amount of from 0 to approx. 80 wt. %, particularly preferably from approx. 10 to approx. 60 wt. %, even more preferably from approx. 20 to approx. 50 wt. %, based on the reactive resin.

The curing of the reactive resin is expediently initiated using a peroxide as an initiator. Any of the peroxides known to a person skilled in the art that are used to cure epoxy (meth)acrylate resins can be used. Peroxides of this kind include organic and inorganic peroxides, either liquid or solid, it also being possible to use hydrogen peroxide. Examples of suitable peroxides are peroxycarbonates (of formula —OC(O)OO—), peroxyesters (of formula —C(O)OO—), diacyl peroxides (of formula —C(O)OOC(O)—), dialkyl peroxides (of formula —OO—), hydroperoxides (of formula —OOH), and the like. These may be present as oligomers or polymers. A comprehensive set of examples of suitable peroxides is described, for example, in application US 2002/0091214 A1, paragraph [0018].

The peroxides are preferably selected from the group of organic peroxides. Suitable organic peroxides are: tertiary alkyl hydroperoxides such as tert-butyl hydroperoxide and other hydroperoxides such as cumene hydroperoxide, peroxyesters or peracids such as tert-butyl peresters (e.g. tert-butyl peroxybenzoate), benzoyl peroxide, peracetates and perbenzoates, lauroyl peroxide including (di)peroxyesters, perethers such as peroxy diethyl ether, perketones, such as methyl ethyl ketone peroxide. The organic peroxides used as curing agents are often tertiary peresters or tertiary hydroperoxides, i.e. peroxide compounds having tertiary carbon atoms which are bonded directly to an —O—O-acyl or —OOH group. However, mixtures of these peroxides with other peroxides can also be used according to the invention. The peroxides may also be mixed peroxides, i.e. peroxides which have two different peroxide-carrying units in one molecule. In a preferred embodiment, benzoyl peroxide (BPO) or tert-butyl peroxybenzoate is used for curing.

The peroxide can be used in its pure form or as a constituent of a mixture. It is typically used as a constituent of a mixture, in particular as a constituent of a hardener component (B) of a reactive resin system. The hardener component used in the examples or a hardener component having the same constituents is particularly preferred.

The present invention also relates to a reactive resin system consisting of a reactive resin component (A) and a hardener component (B). The reactive resin component (A) alone is also an object of the present invention. Said reactive resin component (A) contains the reactive resin according to the invention.

The reactive resin component (A) according to the invention may contain fillers and/or additives in addition to the reactive resin according to the invention. It should be noted that some substances can be used both as a filler and, optionally in modified form, as an additive. For example, fumed silica is preferably used as a filler in the polar, non-after-treated form thereof, and is preferably used as an additive in the non-polar, after-treated form thereof. In cases in which exactly the same substance can be used as a filler or an additive, the total amount thereof should not exceed the upper limit for fillers that is established herein.

In order to prepare a reactive resin component for construction applications, in particular chemical fastening, conventional fillers can be added to the reactive resin according to the invention. These fillers are typically inorganic fillers, as described below for example.

The proportion of the reactive resin according to the invention in the reactive resin component is preferably from approx. 10 to approx. 70 wt. %, more preferably from approx. 30 to approx. 60 wt. %, even more preferably from approx. 35 to approx. 50 wt. %, based on the reactive resin component. Accordingly, the total proportion of the fillers and additives is preferably from approx. 90 to approx. 30 wt. %, more preferably from approx. 70 to approx. 40 wt. %, even more preferably from approx. 75 to approx. 50 wt. %, based on the reactive resin component.

The fillers used are conventional fillers, preferably mineral or mineral-like fillers, such as quartz, glass, sand, quartz sand, quartz powder, porcelain, corundum, ceramics, talc, silicic acid (e.g. fumed silica, in particular polar, non-after-treated fumed silica), silicates, aluminum oxides (e.g. alumina), clay, titanium dioxide, chalk, barite, feldspar, basalt, aluminum hydroxide, granite or sandstone, polymeric fillers such as thermosets, hydraulically curable fillers such as gypsum, quicklime or cement (e.g. aluminate cement (often referred to as alumina cement) or Portland cement), metals such as aluminum, carbon black, and also wood, mineral or organic fibers, or the like, or mixtures of two or more thereof. The fillers may be present in any desired forms, for example as powder or flour, or as shaped bodies, for example in cylindrical, annular, spherical, platelet, rod, saddle or crystal form, or else in fibrous form (fibrillar fillers), and the corresponding base particles preferably have a maximum diameter of approximately 10 mm and a minimum diameter of approximately 1 nm. This means that the diameter is approximately 10 mm or any value less than approximately 10 mm, but more than approximately 1 nm. Preferably, the maximum diameter is a diameter of approximately 5 mm in diameter, more preferably approximately 3 mm, even more preferably approximately 0.7 mm. A maximum diameter of approximately 0.5 mm is very particularly preferred. The more preferred minimum diameter is approximately 10 nm, more preferably approximately 50 nm, most preferably approximately 100 nm. Diameter ranges resulting from a combination of this maximum diameter and minimum diameter are particularly preferred. However, the globular, inert substances (spherical form) have a preferred and more pronounced reinforcing effect. Core-shell particles, preferably in spherical form, can also be used as fillers.

Preferred fillers are selected from the group consisting of cement, silicic acid, quartz, quartz sand, quartz powder, and mixtures of two or more thereof. For the reactive resin component (A), fillers selected from the group consisting of cement, fumed silica, in particular untreated, polar fumed silica, quartz sand, quartz powder, and mixtures of two or more thereof are particularly preferred. For the reactive resin component (A), a mixture of cement (in particular aluminate cement (often also referred to as alumina cement) or Portland cement), fumed silica and quartz sand is very particularly preferred. For the hardener component (B), fumed silica is preferred as the sole filler or as one of a plurality of fillers; particularly preferably, one or more further fillers are present in addition to the fumed silica.

Conventional additives are used as the additives in the reactive resin component (A), i.e. thixotropic agents, such as optionally organically or inorganically after-treated fumed silica (if not already used as a filler), in particular fumed silica after-treated in a non-polar manner, bentonites, alkyl- and methylcelluloses, castor oil derivatives or the like, plasticizers, such as phthalic or sebacic acid esters, antistatic agents, thickening agents, flexibilizers, rheological aids, wetting agents, coloring additives, such as dyes or in particular pigments, for example for different staining of the components for improved control of the mixing thereof, or the like, or mixtures of two or more thereof. Non-reactive diluents (solvents) can also be present, preferably in an amount of up to 30 wt. %, based on the total amount of the reactive resin component, such as low-alkyl ketones, for example acetone, di-low-alkyl low-alkanoyl amides, such as dimethylacetamide, low-alkylbenzenes, such as xylenes or toluene, phthalic acid esters or paraffins, water or glycols. Furthermore, metal scavengers in the form of surface-modified fumed silicas can be present in the reactive resin component. Preferably, at least one thixotropic agent is present as an additive, particularly preferably an organically or inorganically after-treated fumed silica, very particularly preferably a fumed silica after-treated in a non-polar manner, e.g. fumed silica after-treated with polydimethylsiloxane (PDMS), particularly preferably the fumed silica used in the examples which is after-treated in a non-polar manner.

In this regard, reference is made to the applications WO 02/079341 and WO 02/079293 as well as WO 2011/128061 A1, the contents of which are hereby incorporated in this application.

In one embodiment, the reactive resin component may additionally contain an adhesion promoter. By using an adhesion promoter, the cross-linking of the borehole wall with the dowel composition is improved such that the adhesion increases in the cured state. This is important for the use of a two-component dowel composition, for example in boreholes drilled with a diamond drill, and increases the failure bond stress. Suitable adhesion promoters are selected from the group of silanes which are functionalized with further reactive organic groups and can be incorporated into the polymer network. This group includes, for example, 3-(meth)acryloyloxypropyltimethoxysilane, 3-(meth)acryloyloxypropyltrethoxysilane, 3-(meth)acryloyloxymethyltrimethoxysilane, 3-(meth)acryloyloxymethyltiethoxysilane, vinyltrimethoxysilane, vinyltriethoxysilane, functionalized tetraethoxysilane, functionalized tetramethoxysilane, functionalized tetrapropoxysilane, functionalized ethyl or propyl polysilicate, and mixtures of two or more thereof. In this regard, reference is made to the application DE 10 2009 059210, the content of which is incorporated herein by reference.

The adhesion promoter is expediently contained in amounts of from approximately 1 to approximately 10 wt. %, based on the total weight of the reactive resin component (A).

The present invention also relates to a reactive resin system. The reactive resin system according to the invention is a two- or multi-component system, preferably a two-component system. One of the components is the reactive resin component (A) according to the invention, the other a hardener component (B). The latter contains an initiator by means of which the polymerization of the reactive resin is initiated when the components are mixed.

In a preferred embodiment of the reactive resin system according to the invention, the reactive resin system is a two-component system and the reactive resin component (A) also contains, in addition to the reactive resin according to the invention, a hydraulically setting or polycondensable inorganic compound, in particular cement, and the hardener component (B) also contains water in addition to the initiator for the polymerization of the reactive resin. Such hybrid mortar systems are described in detail in DE 4231161 A1. In this case, component (A) preferably contains, as a hydraulically setting or polycondensable inorganic compound, cement, for example Portland cement or alumina cement, with cements which are free of transition metal oxide or have a low level of transition metal being particularly preferred. Gypsum can also be used as a hydraulically setting inorganic compound as such or in a mixture with the cement. Component (A) may also comprise silicatic, polycondensable compounds, in particular soluble, dissolved and/or amorphous-silica-containing substances such as polar, non-after-treated fumed silica, as the polycondensable inorganic compound.

Furthermore, it is preferred that component (A) also contains a thixotropic agent, preferably fumed silica which is after-treated in a non-polar manner, particularly preferably fumed silica after-treated with polydimethylsiloxane (PDMS), very particularly preferably the fumed silica used in the examples which is after-treated in a non-polar manner.

The reactive resin component (A) according to the invention contains:
- the reactive resin according to the invention, as defined above, preferably a preferred embodiment thereof as described above;
- at least one hydraulically setting or polycondensable inorganic compound, preferably cement;
- at least one further filler, preferably quartz sand; and
- at least one thixotropic agent, preferably fumed silica after-treated in a non-polar manner.

In a preferred embodiment, the reactive resin component (A) contains:
- at least one accelerator with high reactivity;
- at least one accelerator with low reactivity;
- at least one backbone resin as defined above, preferably urethane (meth)acrylate;
- at least one reactive diluent, preferably HPMA and/or BDDMA;
- at least one inhibitor as defined above, preferably an inhibitor of the piperidinyl-N-oxyl or tetrahydropyrrole-N-oxyl type, preferably TEMPOL;
- at least one hydraulically setting or polycondensable inorganic compound, preferably cement;
- optionally at least one further filler, preferably quartz sand; and
- at least one thixotropic agent, preferably fumed silica after-treated in a non-polar manner.

In an even more preferred embodiment, the reactive resin component (A) contains:
- at least one accelerator with high reactivity;
- at least one accelerator with low reactivity;
- at least one urethane (meth)acrylate as defined above;
- HPMA and/or BDDMA;
- at least one inhibitor as defined above of the piperdinyl-N-oxyl or tetrahydropyrrole-N-oxyl type, preferably TEMPOL;
- at least one further inhibitor selected from the group consisting of catechols and phenothiazines;
- cement; and
- at least one thixotropic agent, preferably fumed silica after-treated in a non-polar manner.

In an even more preferred embodiment, the reactive resin component (A) contains:
- at least one accelerator with high reactivity;
- at least one accelerator with low reactivity;
- at least one urethane (meth)acrylate as defined above;
- HPMA and/or BDDMA;
- TEMPOL;
- at least one further inhibitor selected from the group consisting of catechols and phenothiazines;
- cement;
- fumed silica after-treated in a non-polar manner; and
- quartz sand.

The hardener component (B) required for a reactive resin system according to the invention, in addition to the reactive resin component (A), typically contains:
- at least one initiator for initiating the polymerization of the reactive resin, preferably benzoyl peroxide (BPO) or tert-butyl peroxybenzoate; and
- water.

In a preferred embodiment, the hardener component (B) contains:
- at least one initiator for initiating the polymerization of the reactive resin, preferably benzoyl peroxide (BPO) or tert-butyl peroxybenzoate;
- at least one filler, preferably fumed silica; and
- water.

In a more preferred embodiment, the hardener component (B) contains:
- benzoyl peroxide (BPO) or tert-butyl peroxybenzoate for initiating the polymerization of the reactive resin;
- fumed silica; and
- water.

The reactive resin components (A) and the hardener components (B) in each of these embodiments can be combined with one another as desired.

In a particularly preferred embodiment, the constituents of the reactive resin according to the invention or of the reactive resin component according to the invention are one or more of the constituents which are mentioned in the examples according to the invention. Reactive resins or reactive resin components which contain the same constituents or consist of the same constituents as are mentioned in the individual examples according to the invention, preferably approximately in the proportions stated in said examples, are very particularly preferred.

The reactive resins according to the invention can be used in many fields in which unsaturated polyester resins, vinyl ester resins or vinyl ester urethane resins are otherwise conventionally used. They can be used in particular for preparing reactive resin mortars for construction applications, such as chemical fastening.

The reactive resin according to the invention is usually used as a resin constituent in the reactive resin component of a multi-component system, typically a two-component system consisting of a reactive resin component (A) and a hardener component (B). This multi-component system may be in the form of a cartridge system or a film pouch system. In the intended use of the system, the components are either ejected from the cartridges or film pouches under the application of mechanical forces or by gas pressure, are mixed together, preferably by means of a static mixer through which the constituents are passed, and introduced into the borehole, after which the devices to be fastened, such as threaded anchor rods and the like, are introduced into the borehole which is provided with the curing reactive resin, and are adjusted accordingly.

Such a reactive resin system is used primarily in the construction sector, for example for the repair of concrete, as polymer concrete, as a coating material based on synthetic resin or as a cold-curing road marking. It is particularly suitable for chemically fastening anchoring means, such as anchors, reinforcing bars, screws and the like, in boreholes, in particular in boreholes in various substrates, in particular mineral substrates, such as those based on concrete, aerated concrete, brickwork, sand-lime brick, sandstone, natural stone, glass and the like, and metal substrates such as those made of steel. In one embodiment, the substrate of the borehole is concrete, and the anchoring means is made of steel or iron. In another embodiment, the substrate of the borehole is steel, and the anchoring means is made of steel or iron.

Another object of the invention is the use of the reactive resin according to the invention and/or a reactive resin system as a constituent of a curable binder or as a curable binder, in particular for fastening anchoring means in boreholes of different substrates and for structural bonding. In one embodiment, the substrate of the borehole is concrete, and the anchoring means is made of steel or iron. In another embodiment, the substrate of the borehole is steel, and the anchoring means is made of steel or iron. Preferably, the steel borehole has grooves.

Another object of the invention is the use of a combination of at least one accelerator with high reactivity and at least one accelerator with low reactivity in a reactive resin system to adjust the processing time. In the combination, the molar ratio of the at least one accelerator with high reactivity with respect to the at least one accelerator with low reactivity is from 1.0:1.0 to 1.0:1.6, preferably from 1.0:1.1 to 1.0:1.6. Particularly preferably, the molar ratio of the at least one accelerator with high reactivity with respect to the at least one accelerator with low reactivity is from 1.0:1.0 to 1.0:1.4, in particular from 1.0:1.1 to 1.0:1.4.

Another object of the invention is the use of at least one accelerator with high reactivity in a reactive resin system containing at least one accelerator with low reactivity to adjust the processing time.

Another object of the invention is the use of at least one accelerator with low reactivity in a reactive resin system containing at least one accelerator with high reactivity to adjust the processing time.

Another object of the invention is an accelerator composition for a reactive resin system comprising at least one accelerator with high reactivity and at least one accelerator with low reactivity. In the accelerator composition, the molar ratio of the at least one accelerator with high reactivity with respect to the at least one accelerator with low reactivity is from 1.0:1.0 to 1.0:1.6, preferably from 1.0:1.1 to 1.0:1.6. Particularly preferably, the molar ratio of the at least one accelerator with high reactivity with respect to the at least one accelerator with low reactivity is from 1.0:1.0 to 1.0:1.4, in particular from 1.0:1.1 to 1.0:1.4.

The invention is explained in greater detail in the following with reference to a number of examples. However, the invention is not limited to the specific embodiments shown in the examples.

EXAMPLES

Unless stated otherwise, all constituents of the compositions that are listed here are commercially available and were used in the usual commercial quality.

Unless stated otherwise, all % and ppm data given in the examples relate to the total weight of the composition described, as a calculation basis.

Preparation Example 1: Preparation of Accelerators with Methacrylate Function From Primary Anilines and Monomeric Bisphenol a Diglycidyl Ether:

1 eq. bisphenol A diglycidyl ether ((BADGE) Epilox® A 19-03; epoxy equivalent weight 183 g/mol; LEUNA-Harze GmbH) was placed completely into the round-bottom flask, mixed with 0.5 eq. of a primary aniline, 1.1 eq. methacrylic acid ((MAA) BASF SE), 0.4 wt. % tetraethylammonium bromide (Merck KgaA), 230 ppm tempol (Evonik Industries AG) and 160 ppm phenothiazine (Allessa GmbH), and temperature-controlled to 120° C. It was stirred until, after approximately 4 h, complete conversion was indicated by thin layer chromatography.

It was diluted with 20 wt. % of hydroxypropyl methacrylate (HPMA, Evonik Industries AG), post-stabilized with 400 ppm tempol and cooled.

In order to reduce the viscosity, when using para-toluidine as the primary aniline, the diglycidyl ether was partially reacted with 0.5 eq. methacrylic acid for 1 h at 80° C.

| Primary aniline used | Source | Abbreviation for the resulting accelerator |
|---|---|---|
| meta-toluidine | Alfa Aesar | mT-BADGE-MAA |
| para-toluidine | Sigma-Aldrich Chemie GmbH | pT-BADGE-MAA |
| para-bromaniline | TCI Deutschland GmbH | pBrA-BADGE-MAA |
| para-chloraniline | TCI Deutschland GmbH | pClA-BADGE-MAA |
| meta-chloro-para-methylaniline | TCI Deutschland GmbH | 3Cl4MeA-BADGE-MAA |
| para-tert-butylaniline | TCI Deutschland GmbH | ptBuA-BADGE-MAA |

From Secondary Anilines and Monomeric Bisphenol a Diglycidyl Ether:

1 eq. bisphenol A diglycidyl ether (Epilox® A 19-03; epoxy equivalent weight 183 g/mol; LEUNA-Harze GmbH) was placed completely into the round-bottom flask, mixed with 1 eq. of a secondary aniline, 1.1 eq. methacrylic acid (BASF SE), 0.4 wt. % tetraethylammonium bromide (Merck KGaA), 230 ppm tempol (Evonik Industries AG) and 160 ppm phenothiazine (Allessa GmbH), and temperature-controlled to 100° C. It was stirred until, after approximately 4 h, complete conversion was indicated by thin layer chromatography (stationary phase: silica gel plate; eluent: petroleum ether:ethyl acetate 1:1), i.e. no free amine was detectable.

It was diluted with 20 wt. % HPMA (Evonik Industries AG), post-stabilized with 400 ppm tempol and cooled.

From Secondary Anilines and Polymeric Bisphenol A Diglycidyl Ether:

0.5 eq. bisphenol A diglycidyl ether (Epilox® A 19-03; epoxy equivalent weight 183 g/mol; LEUNA-Harze GmbH) and 0.4 eq. bisphenol A diglycidyl ether (Epilox® A 50-02; epoxy equivalent weight 485 g/mol; LEUNA-Harze GmbH) were placed completely into the round-bottom flask, mixed with 0.9 eq. of a secondary aniline, 1 eq. methacrylic acid (BASF SE), 0.4 wt. % tetraethylammonium bromide (Merck KgaA), 230 ppm tempol (Evonik Industries AG) and 160 ppm phenothiazine (Allessa GmbH), and temperature-controlled to 100° C. It was stirred until, after approximately 4 h, complete conversion was indicated by thin layer chromatography.

It was diluted with 20 wt. % HPMA (Visiomer® HPMA 98, Evonik Industries AG), post-stabilized with 400 ppm tempol and cooled.

| Secondary aniline used | Source | Abbreviation for the resulting amine accelerator ("poly" represents accelerators that were prepared using polymeric bisphenol A diglycidyl ether) |
|---|---|---|
| N-methyl-p-toluidine | TCI Deutschland GmbH | NMepT-BADGE-MAA or polyNMepT-BADGE-MAA |
| N-ethyl-p-toluidine | TCI Deutschland GmbH | NEtpT-BADGE-MAA or polyNEtpT-BADGE-MAA |
| N-ethyl-m-toluidine | TCI Deutschland GmbH | NEtmT-BADGE-MAA or polyNEtmT-BADGE-MAA |
| N-ethylaniline | TCI Deutschland GmbH | NEtA-BADGE-MAA |
| N-(2-hydroxyethyl)aniline | TCI Deutschland GmbH | NHOEtA-BADGE-MAA |
| N-dodecylaniline | TCI Deutschland GmbH | NdodecA-BADGE-MAA |
| N-ethyl-para-chloroaniline | TCI Deutschland GmbH | NEtpClA-BADGE-MAA |

Preparation Example 2: Preparation of Accelerators without Methacrylate Function 1 eq. of a primary aniline (for example as listed in preparation example 1) is dissolved in 2.1 eq. glycidyl ether (TCI Deutschland GmbH) and mixed with 0.4 wt. % tetraethylammonium bromide (Merck KgaA). The mixture is heated to 130° C. and stirred for 4 hours.

Preparation Example 3: Preparation of a Reactive Resin

An accelerator as defined herein (for example an accelerator prepared according to preparation example 1 or preparation example 2) was combined, in an amount corresponding to 7.8 mmol amine/100 g of resin mixture ($c_{tot}$=7.8 mmol/100 g resin), with 15.13 wt. % HPMA (Visiomer® HPMA 98, Evonik Industries AG), 32.75 wt. % 1,4-butanediol dimethacrylate (Visiomer® 1,4-BDDMA, Evonik Industries AG), 0.25 wt. % TBC (tert-butylpyrocatechol, Rhodia), 0.015 wt. % tempol (Evonik Industries AG) and, to make up 100% (the amount was adjusted such that the sum of all the resin components was 100%), UMA/HPMA reactive resin masterbatch (urethane methacrylate resin in 35 wt. % HMPA prepared according to EP 0 713 015 A1, example A3).

Test Example 1: Gel Time and Maximum Reactivity Temperature

The gel time was determined as follows:

The gel time (denoted by $t_{hg25° C.}$ for the reactive resin) was measured and expressed as the period of time from the time of the addition of an initiator to initialize the curing, to the time when the composition has reached a temperature of 50° C. The measurement was as follows:

The gel time after the addition of the initiator (Perkadox® 20S (Akzo), weight ratio of reactive resin:initiator 100:30) to the reactive resin prepared according to preparation example 3 was determined using a conventional apparatus (Geltimer, WKS Informatik) at a starting temperature of 25° C. For this purpose, the mixture was poured into a test tube after the addition of the initiator, up to a height of 4 cm below the rim, the test tube being kept at a temperature of 25° C. (DIN 16945, DIN EN ISO 9396). A glass rod or spindle was moved up and down in the mixture at 10 strokes per minute. The gel time corresponds to the time period, after the addition of the initiator, after which a temperature of 50° C. was measured in the mixture.

The maximum reactivity temperature $T_{max}$ corresponds to the maximum of the temperature curve in the gel time measurement. In order to determine this maximum, the gel time measurement was continued after reaching the temperature of 50° C. until the maximum of the temperature curve was exceeded.

The results are shown in the following table:

| Accelerator consisting of amine | Gel time: $t_{hg, 25° C.}$ | Maximum reactivity temperature: $T_{max}$ |
|---|---|---|
| NMepT-BADGE-MAA | 2.40 min | 168° C. |
| NEtpT-BADGE-MAA | 3.70 min | 162° C. |
| NEtmT-BADGE-MAA | 9 min | 164° C. |
| mT-BADGE-MAA | 21 min | 162° C. |
| pT-BADGE-MAA | 5.4 min | 163° C. |
| NEtA-BADGE-MAA | 22 min | 162° C. |
| NHOEtA-BADGE-MAA | 33 min | 159° C. |
| pBrA-BADGE-MAA | 100 min | 156° C. |
| ptBuA-BADGE-MAA | 11 min | 157° C. |
| NdodecA-BADGE-MAA | 20 min | 158° C. |
| pClA-BADGE-MAA | 72 min | 155° C. |
| 3Cl4MeA-BADGE-MAA | 36 min | 155° C. |
| NEtpCl-BADGE-MAA | 42 min | 158° C. |
| polyNMepT-BADGE-MAA | 2.30 min | 157° C. |
| polyNEtpT-BADGE-MAA | 3.60 min | 161° C. |
| polyNEtmT-BADGE-MAA | 9 min | 162° C. |
| pClA-tBuGE | 50 min | 160° C. |
| pClA-EtGE | 60 min | 157° C. |
| pBrA-tBuGE | 52 min | 156° C. |
| 4-bromo-N,N-diethylaniline | 37 min | 156° C. |

Preparation Example 4: Preparation of a Reactive Resin with Accelerator Combination Accelerators (concentration based on amine; in mmol amine/100 g resin mixture), TBC (tert-butylpyrocatechol, Rhodia) and BC (pyrocatechol, Rhodia) were added in an amount corresponding to the following table in 40.12 wt. % 1,4-butanediol dimethacrylate (Visiomer®B 1,4-BDDMA, Evonik Industries AG), 0.015 wt. % tempol (Evonik Industries AG) and, to make up 100% (the amount was adjusted such that the sum of all the resin components was 100%) UMA/HPMA reactive resin masterbatch (urethane methacrylate resin in 35 wt. % HPMA prepared analogously to EP 0 713 015 A1).

|  | Ref Ex | Ex1 | Ex2 | Ex3 | Ex4 | Ex5 | Ex6 | Ex7 |
|---|---|---|---|---|---|---|---|---|
| TBC [wt. %] | 0.098 | 0.07 | 0.08 | 0.07 | 0.082 | 0.082 | 0.082 | 0.059 |
| BC [wt. %] | 0.392 | 0.28 | 0.29 | 0.27 | 0.295 | 0.295 | 0.295 | 0.263 |

-continued

|  | Ref Ex | Ex1 | Ex2 | Ex3 | Ex4 | Ex5 | Ex6 | Ex7 |
|---|---|---|---|---|---|---|---|---|
| DiPpT [mmol/100 g resin] | 6.9 | — | 1.9 | 3.325 | 3.325 | 3.325 | 3.325 | 3.325 |
| DHEmT (dihydroxy ethyl-m-toluidine, Saltigo) [mmol/100 g resin] | 2 | — | 2.85 | — | — | — | — | — |
| NEtpT-BADGE-MAA [mmol/100 g] | — | 1.9 | — | — | — | — | — | — |
| NEtmT-BADGE-MAA [mmol/100 g] | — | 2.85 | — | — | — | — | — | — |
| pCIA-BADGE-MAA [mmol/100 g] | — | 4.75 | 4.75 | 4.75 | — | — | — | — |
| pCIA-tBuGE [mmol/100 g] | — | — | — | — | 4.75 | — | — | — |
| pCIA-EtGE [mmol/100 g] | — | — | — | — | — | 4.75 | — | — |
| pBrA-tBuGE [mmol/100 g] | — | — | — | — | — | — | 4.75 | — |
| 4-bromo-N,N-diethylaniline [mmol/100 g] | — | — | — | — | — | — | — | 4.75 |

Preparation Example 5: Reactive Resin Component (A)

In 34.5 wt. % of a reactive resin prepared in preparation example 4, 44.2 wt. % quartz sand F32 (Quarzwerke Frechen), 18.5 wt. % aluminate cement Secar® 80 (Kerneos), 1 wt. % fumed silica CAB-O-SIL® 720 (Cabot Rheinfelden) and 1.8 wt. % fumed silica Aerosil® R 812 (Evonik Industries AG) were dispersed in a dissolver under a vacuum.

Test Example 2: Measurement of Bond Stress

A reactive resin system consisting of a reactive resin component (A) prepared according to preparation example 5 and the commercial hardener component HY-200 B (Hilti) used as a hardener component (B) was poured into a plastic cartridge (Ritter GmbH: volume ratio A:B=5:1) having the inner diameters 32.5 mm (component (A)) and 14 mm (component (B)), and tested as follows:

In order to determine the shear strength (synonym: bond stress) achieved by means of the reactive resin system according to comparative example 1 and according to examples 1 to 4, the mixed reactive resin system (i.e. the mixture of reactive resin component (A) and hardener component (B) in a volume ratio of A:B=5:1) is introduced into a steel sleeve having a defined geometry and a defined fill level of the mortar (embedding depth). An anchor rod was then placed in the center of the steel sleeve filled with mortar, using a centering aid. After curing of the mortar at 25° C. or 40° C. and for at least 12 hours, the sample was screwed into a tensile testing machine using a thread adapter (Brand: Zwick Roell Z050, 50 kN). The sample was loaded with tensile force at a defined speed until failure. The corresponding force-distance dependency was continuously recorded. Five individual measurements were carried out in each case, and the mean value of the maximum force upon failure was calculated.

Anchor rods having an M8 thread and steel sleeves having the following geometry were used to carry out the measurements:
Undercut depth: 0.35+/−0.02 mm
Undercut width: 2 mm
Embedding depth: 36 mm
Inner diameter: 12 mm The shear strength determined from these measurements is defined as the quotient of the maximum force upon failure and the shear surface of the anchor rod used (anchor rod M8: 904.3 $mm^2$).

In addition, the mortar reactivity $t_{m,25} \rightarrow 50°$ C. was determined. The reactivity period was measured. This means the period of time from the time of the addition of an initiator for initializing the curing to the time at which the composition has reached a temperature of 50° C. The measurement was as follows:

The mortar reactivity $t_{m,25} \rightarrow 50°$ C. after addition of the commercial hardener component HY-200 B (Hilti) used as the hardener component (B), and containing an initiator, to the resin component (A) in the volume ratio A:B=5:1 was determined using a conventional device (Geltimer. WKS Informatik) at a starting temperature of 25° C. For this purpose, the mixture was poured into a test tube after the addition of the initiator-containing hardener component, up to a height of 4 cm below the rim, the test tube being kept at a temperature of 25° C. (DIN 16945, DIN EN ISO 9396). A glass rod or spindle was moved up and down at 10 strokes per minute in the mixture. The mortar reactivity corresponds to the time period, after the addition of the initiator-containing hardener component, after which a temperature of 50° C. was measured in the mixture.

The results of the measurements are shown in the following table:

|  | Ref Ex | Ex1 | Ex2 | Ex3 | Ex4 | Ex5 | Ex6 | Ex7 |
|---|---|---|---|---|---|---|---|---|
| Bond stress [N/$mm^2$] at 25° C. | 30.2 ± 4.3 | 29.1 ± 3.6 | 27.3 ± 1.7 | 29.4 ± 1.5 | 31.5 ± 5.2 | 31.5 ± 3.2 | 31.4 ± 3.1 | 31.3 ± 3.3 |
| Bond stress [N/$mm^2$] at 40° C. | 2.9 ± 2.9 | 23.2 ± 1 | 23.7 ± 1.5 | 25.1 ± 1.6 | 29.7 ± 1.2 | 32.0 ± 3.9 | 30.9 ± 2.9 | 28.9 3.1 |
| Mortar reactivity [min]: $t_{m,25} \rightarrow 50°$ C. | 22.2 | 21.9 | 18.5 | 21.2 | 18.4 | 20.9 | 21.3 | 19.1 |

CONCLUSION

Mixtures of accelerators were used in these tests. The accelerators used were either accelerators with low reactivity or accelerators with high reactivity. Accelerators with low reactivity here mean accelerators which, as the only accelerator in the reactive resin in test example 1, had a gel time of from 40 minutes to 200 minutes, while accelerators with high reactivity mean accelerators which, as the only accelerator in the reactive resin in test example 1, had a gel time of from 2 to 40 minutes.

The examples show that chemical dowels with high bond stress at both 25° C. and 40° C. and a mortar reactivity of approximately 20 minutes can be produced by a combination of accelerators with high and low reactivity, whereas using a combination of accelerators with high reactivity (comparative example 1, mixture of DiPpT and DHEmT) leads to an unsatisfactory bond stress at 40° C.

The invention claimed is:

1. A reactive resin, containing:
   at least one accelerator with high reactivity; and
   at least one accelerator with low reactivity;
   wherein the reactive resin with only the at least one accelerator with high reactivity has a gel time of from 2 minutes to 40 minutes; and
   wherein the reactive resin with only the at least one accelerator with low reactivity has a gel time of from 40 minutes to 200 minutes, and
   wherein a molar ratio of the at least one accelerator with high reactivity with respect to the at least one accelerator with low reactivity is from 1.0:1.0 to 1.0:1.6, and
   wherein the reactive resin comprises at least one inhibitor and/or at least one reactive diluent.

2. The reactive resin according to claim 1, wherein the molar ratio of the at least one accelerator with high reactivity with respect to the at least one accelerator with low reactivity is from 1.0:1.0 to 1.0:1.4.

3. The reactive resin according to claim 1, wherein the at least one accelerator with high reactivity and/or the at least one accelerator with low reactivity are covalently incorporated in the resin.

4. A reactive resin component (A), for a reactive resin system containing the reactive resin according to claim 1.

5. A reactive resin system comprising the reactive resin component (A) according to claim 4, and a hardener component (B) containing an initiator.

6. The reactive resin system according to claim 5, wherein at least one of the reactive resin component (A) or the hardener component (B) contains an inorganic filler.

7. The reactive resin system according to claim 5, wherein the reactive resin component (A) contains:
   the at least one accelerator with high reactivity;
   the at least one accelerator with low reactivity;
   at least one backbone resin;
   at least one reactive diluent;
   at least one inhibitor;
   at least one hydraulically setting or polycondensable inorganic compound; and
   at least one thixotropic agent, and
   wherein the hardener component (B) contains:
   at least one initiator for initiating polymerization of the reactive resin;
   at least one filler; and
   water.

8. A method, comprising:
   chemical fastening of anchoring means in boreholes or structural bonding with the reactive resin according to claim 1.

9. A method, comprising:
   adjusting a processing time of a reactive resin system with a combination of at least one accelerator with high reactivity and at least one accelerator with low reactivity,
   wherein a reactive resin with only the at least one accelerator with high reactivity has a gel time of from 2 minutes to 40; and
   wherein a reactive resin with only the at least one accelerator with low reactivity has a gel time of from 40 minutes to 200 minutes; and
   wherein a molar ratio of the at least one accelerator with high reactivity with respect to the at least one accelerator with low reactivity is from 1.0:1.0 to 1.0:1.6.

10. The method according to claim 9, wherein the molar ratio of the at least one accelerator with high reactivity with respect to the at one least accelerator with low reactivity is from 1.0:1.0 to 1.0:1.4.

11. An accelerator composition for a reactive resin system, comprising:
    at least one accelerator with high reactivity; and
    at least one accelerator with low reactivity;
    wherein a reactive resin with only the at least one accelerator with high reactivity has a gel time of from 2 minutes to 40 minutes; and
    wherein a reactive resin with only the at least one accelerator with low reactivity has a gel time of from 40 minutes to 200 minutes; and
    wherein a molar ratio of the at least one accelerator with high reactivity with respect to the at least one accelerator with low reactivity is from 1.0:1.0 to 1.0:1.6.

12. The accelerator composition for a reactive resin system according to claim 11, wherein the molar ratio of the at least one accelerator with high reactivity with respect to the at least one accelerator with low reactivity is from 1.0:1.0 to 1.0:1.4.

13. A method, comprising:
    chemical fastening of anchoring means in boreholes or structural bonding with the reactive resin system according to claim 5.

14. The reactive resin according to claim 2, wherein the molar ratio of the at least one accelerator with high reactivity with respect to the at least one accelerator with low reactivity is from 1.0:1.1 to 1.0:1.4.

15. The method according to claim 10, wherein the molar ratio of the at least one accelerator with high reactivity with respect to the at one least accelerator with low reactivity is from 1.0:1.1 to 1.0:1.4.

16. The accelerator composition for a reactive resin system according to claim 12, wherein the molar ratio of the at least one accelerator with high reactivity with respect to the at least one accelerator with low reactivity is from 1.0:1.1 to 1.0:1.4.

* * * * *